United States Patent
Tatebe et al.

(10) Patent No.: US 12,417,700 B2
(45) Date of Patent: Sep. 16, 2025

(54) INFORMATION NOTIFICATION SYSTEM AND INFORMATION NOTIFICATION METHOD

(71) Applicant: TOYOTA JIDOSHA KABUSHIKI KAISHA, Toyota (JP)

(72) Inventors: Yoshiki Tatebe, Toyota (JP); Yoshiya Iwaki, Miyoshi (JP); Takashi Yamaguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 118 days.

(21) Appl. No.: 18/371,502

(22) Filed: Sep. 22, 2023

(65) Prior Publication Data

US 2024/0101137 A1    Mar. 28, 2024

(30) Foreign Application Priority Data

Sep. 26, 2022    (JP) .................. 2022-152876

(51) Int. Cl.
*G08G 1/0967*    (2006.01)
*G06V 20/58*     (2022.01)
*G08G 1/00*      (2006.01)
*B60W 40/00*     (2006.01)

(52) U.S. Cl.
CPC ......... *G08G 1/0967* (2013.01); *G06V 20/582* (2022.01); *G08G 1/00* (2013.01); *B60W 40/00* (2013.01); *B60W 2420/403* (2013.01); *B60W 2555/60* (2020.02)

(58) Field of Classification Search
CPC ...... G08G 1/00; G08G 1/0112; G08G 1/0141; G08G 1/04; G08G 1/096725; G01C 21/34; B60W 40/00; B60W 40/04; B60W 40/06; B60W 40/105
See application file for complete search history.

(56) References Cited

U.S. PATENT DOCUMENTS

| | | |
|---|---|---|
| 9,835,468 B2 | 12/2017 | Yoshitomi et al. |
| 10,017,178 B2 | 7/2018 | Morimoto et al. |
| 10,132,642 B2 | 11/2018 | Yoshitomi et al. |
| 10,152,883 B2 | 12/2018 | Fujimaki |
| 10,354,156 B2 | 7/2019 | Nishimura et al. |
| 10,657,394 B2 | 5/2020 | Stenneth |
| 10,679,077 B2 | 6/2020 | Kinoshita et al. |
| 11,010,624 B2 | 5/2021 | Hayashi et al. |
| 11,017,247 B2 | 5/2021 | Hayashi et al. |

(Continued)

FOREIGN PATENT DOCUMENTS

| | | |
|---|---|---|
| JP | 2009-250892 A | 10/2009 |
| JP | 2017-117040 A | 6/2017 |

*Primary Examiner* — Van T Trieu
(74) *Attorney, Agent, or Firm* — Dinsmore & Shohl LLP

(57) ABSTRACT

An information notification system notifies a user of a vehicle of information. A first condition is that one or more time-designated speed limit signs recognized by a camera mounted on the vehicle designate all times of day as a whole. The information notification system determines whether or not the first condition is satisfied. When the first condition is not satisfied, the information notification system notifies the user of at least a legal speed limit on a road on which the one or more time-designated speed limit signs are installed, based on reference information on the legal speed limit in a region in which the vehicle is used.

7 Claims, 10 Drawing Sheets

(56) References Cited

U.S. PATENT DOCUMENTS

| | | |
|---|---|---|
| 11,117,595 B2 | 9/2021 | Sasaki et al. |
| 2009/0259395 A1 | 10/2009 | Sobue |
| 2012/0162431 A1* | 6/2012 | Riesebosch .............. G08G 1/04 |
| | | 348/149 |
| 2015/0365802 A1* | 12/2015 | Barr ...................... H04W 4/025 |
| | | 455/456.3 |
| 2017/0178591 A1 | 6/2017 | Takatsudo et al. |
| 2018/0239971 A1 | 8/2018 | Kim et al. |
| 2021/0247526 A1* | 8/2021 | Kijima ................... G01S 19/45 |
| 2022/0397402 A1* | 12/2022 | Bolless .............. G01C 21/3415 |

\* cited by examiner

<REFERENCE INFORMATION REF>

| ROAD TYPE | LEGAL SPEED LIMIT |
|---|---|
| EXPRESSWAY (LIMITED HIGHWAY) | 130 km/h |
| GENERAL ROAD | 80 km/h |
| ⋮ | ⋮ |

*FIG. 6*

INFORMATION NOTIFICATION SYSTEM AND INFORMATION NOTIFICATION METHOD

CROSS-REFERENCES TO RELATED APPLICATION

The present disclosure claims priority to Japanese Patent Application No. 2022-152876, filed on Sep. 26, 2022, the contents of which application are incorporated herein by reference in their entirety.

TECHNICAL FIELD

The present disclosure relates to a technique for notifying a user of a vehicle of information. In particular, the present disclosure relates to a technique for notifying a user of a vehicle of information on a speed limit.

BACKGROUND ART

Patent Literature 1 discloses a sign display device for a vehicle. The sign display device detects a sign in front of a vehicle by the use of a camera. When first sign information regarding a first maximum speed in a first section and second sign information regarding a second maximum speed in a second section are detected, the sign display device displays the first sign information and the second sign information side by side.

LIST OF RELATED ART

Patent Literature 1: Japanese Laid-Open Patent Application No. JP-2017-117040

SUMMARY

Such a technique that recognizes a speed limit sign and notifies a user of a vehicle of a speed limit designated by the speed limit sign is useful. However, among various types of the speed limit sign, there is a time-designated speed limit sign that designates (shows) a speed limit for a specific time of day. Even if the user is notified of the speed limit designated by the time-designated speed limit sign, the user cannot know the speed limit for other than the specific time of day. For example, when a current time is outside the specific time of day, the notification of the speed limit for the specific time of day is not particularly useful. There is room for improvement in the technique for notifying the user of the vehicle of the speed limit.

A first aspect is directed to an information notification system for notifying a user of a vehicle of information. The information notification system includes: one or more processors; and one or more memory devices configured to store reference information on a legal speed limit in a region in which the vehicle is used. The one or more processors determine whether or not a first condition is satisfied. The first condition is that one or more time-designated speed limit signs recognized by a camera mounted on the vehicle designate all times of day as a whole. When the first condition is not satisfied, the one or more processors notify the user of at least the legal speed limit on a road on which the one or more time-designated speed limit signs are installed, based on the reference information.

A second aspect is directed to an information notification method for notifying a user of a vehicle of information by a computer. The information notification method includes: determining whether or not a first condition is satisfied, the first condition being that one or more time-designated speed limit signs recognized by a camera mounted on the vehicle designate all times of day as a whole; and when the first condition is not satisfied, notifying the user of at least a legal speed limit on a road on which the one or more time-designated speed limit signs are installed, based on reference information on the legal speed limit in a region in which the vehicle is used.

According to the present disclosure, when the time-designated speed limit sign recognized does not designate all times of day as a whole, the user of the vehicle is notified of at least the legal speed limit. Such the notification of the legal speed limit is useful for the user, and thus convenience for the user is improved.

BRIEF DESCRIPTION OF DRAWINGS

FIG. 6 is a conceptual diagram for explaining another example of reference information according to the first embodiment;

DETAILED DESCRIPTION

Embodiments of the present disclosure will be described with reference to the accompanying drawings.

1. First Embodiment

1-1. Overview of Information Notification System

Figure 1:
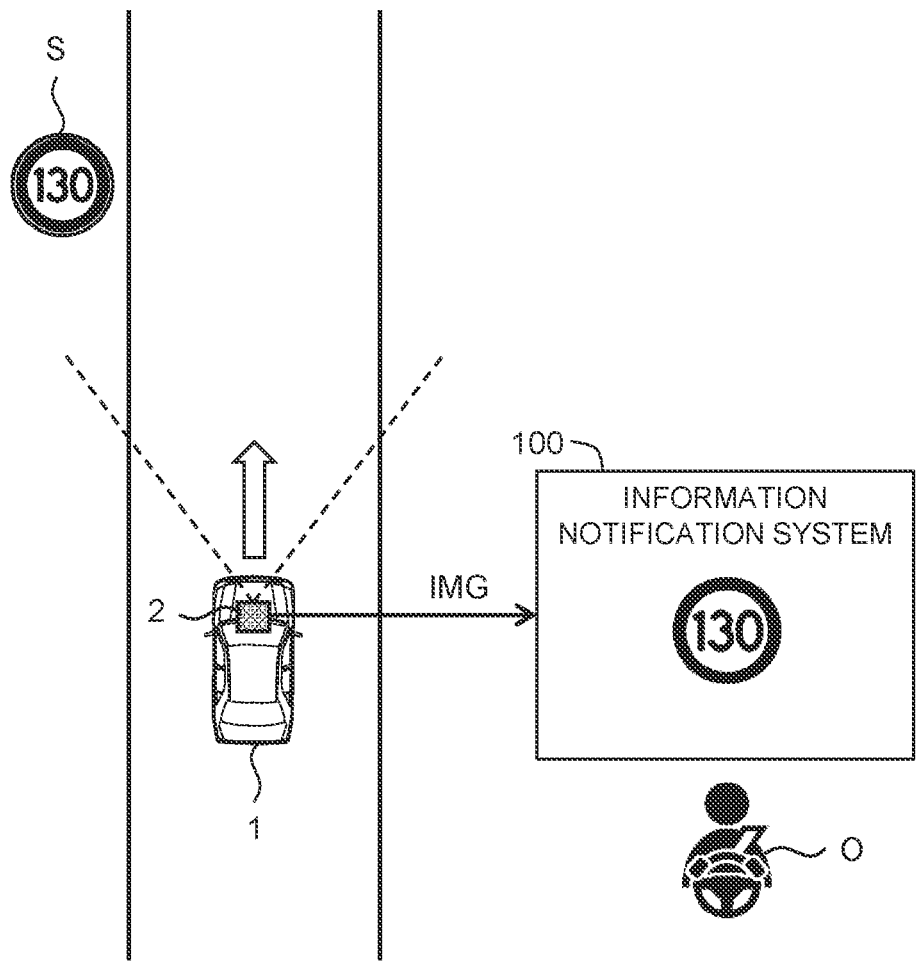
FIG. 1 is a conceptual diagram for explaining an overview of an information notification system according to a first embodiment.

FIG. 1 is a conceptual diagram for explaining an overview of an information notification system 100 according to the present embodiment. The information notification system 100 notifies a user O of a vehicle 1 of information related to the vehicle 1. For example, the user O of the vehicle 1 is an operator of the vehicle 1. The operator of the vehicle 1 may be a driver in the vehicle 1 or a remote operator who remotely operates (remotely drives or remotely supports) the vehicle 1. The user O of the vehicle 1 may be an occupant in the vehicle 1. The vehicle 1 may be an autonomous driving vehicle. The information notification system 100 may be installed on the vehicle 1, may be included in a remote operator terminal operated by the remote operator, or may be dispersedly located in the vehicle 1 and the remote operator terminal.

For example, the information notification system 100 notifies the user O of information regarding a speed limit of a road on which the vehicle 1 travels. The speed limit of the road on which the vehicle 1 travels is obtained from, for example, a speed limit sign S installed on the road. The information notification system 100 recognizes the speed limit sign S installed on the road on which the vehicle 1 travels, and notifies the user O of the speed limit designated by the recognized speed limit sign S.

A camera 2 mounted on the vehicle 1 is used for recognizing a speed limit sign S. The camera 2 captures a situation around the vehicle 1 to acquire an image IMG indicating the situation around the vehicle 1. The information notification system 100 acquires the image IMG captured by the camera 2 and recognizes a speed limit sign S by analyzing the image IMG. Typically, the information notification system 100 recognizes a speed limit sign S from the image IMG by using image recognition AI (Artificial Intelligence). The image recognition AI is generated in advance through a learning method such as deep learning. For example, the image recognition AI is trained to detect a variety of signs in the image IMG and to identify a type of each detected sign. As another example, the image recognition AI may be trained to be able to detect a speed limit sign S in the image IMG. In either case, it is possible to recognize a speed limit sign S by using the camera 2 and the image recognition AI.

The information notification system 100 includes a notification device for notifying the user O of information. The information notification system 100 notifies the user O of the speed limit designated by the recognized speed limit sign S through the notification device.

For example, the notification device includes a display device. The information notification system 100 displays an image itself of the recognized speed limit sign S on the display device. Alternatively, the information notification system 100 may read numbers (figures) shown on the speed limit sign S based on the image of the recognized speed limit sign S. In other words, the information notification system 100 may recognize the speed limit designated by the speed limit sign S on the basis of the image of the recognized speed limit sign S. In this case, the information notification system 100 displays the recognized speed limit on the display device. The speed limit may be represented by an icon or may be represented by characters (numbers).

As another example, the notification device may include a speaker. In this case, the information notification system 100 outputs audio information notifying the speed limit from the speaker.

The technique for notifying of the speed limit in this manner is useful for the user O of the vehicle 1.

1-2. Time-Designated Speed Limit Sign

Among various types of the speed limit sign S, there is a "time-designated speed limit sign ST" that designates (shows) a speed limit for a specific time of one day. Typically, the time-designated speed limit sign ST includes not only a main portion for designating the speed limit but also an auxiliary portion for designating a time of day to which the speed limit is applied. The image recognition AI is able to determine whether or not the speed limit sign S is the time-designated speed limit sign ST based on presence or absence of the auxiliary portion designating the time of day. The image recognition AI may recognize the time of day designated by the time-designated speed limit sign ST.

Even if the user O of the vehicle 1 is notified of the speed limit designated by the time-designated speed limit sign ST, the user O cannot know the speed limit for other than the specific time of day. For example, when a current time is outside the specific time of day, the notification of the speed limit for the specific time of day is not particularly useful. In view of above, the present embodiment provides a technique capable of further improving convenience for the user O of the vehicle 1.

Figure 2:
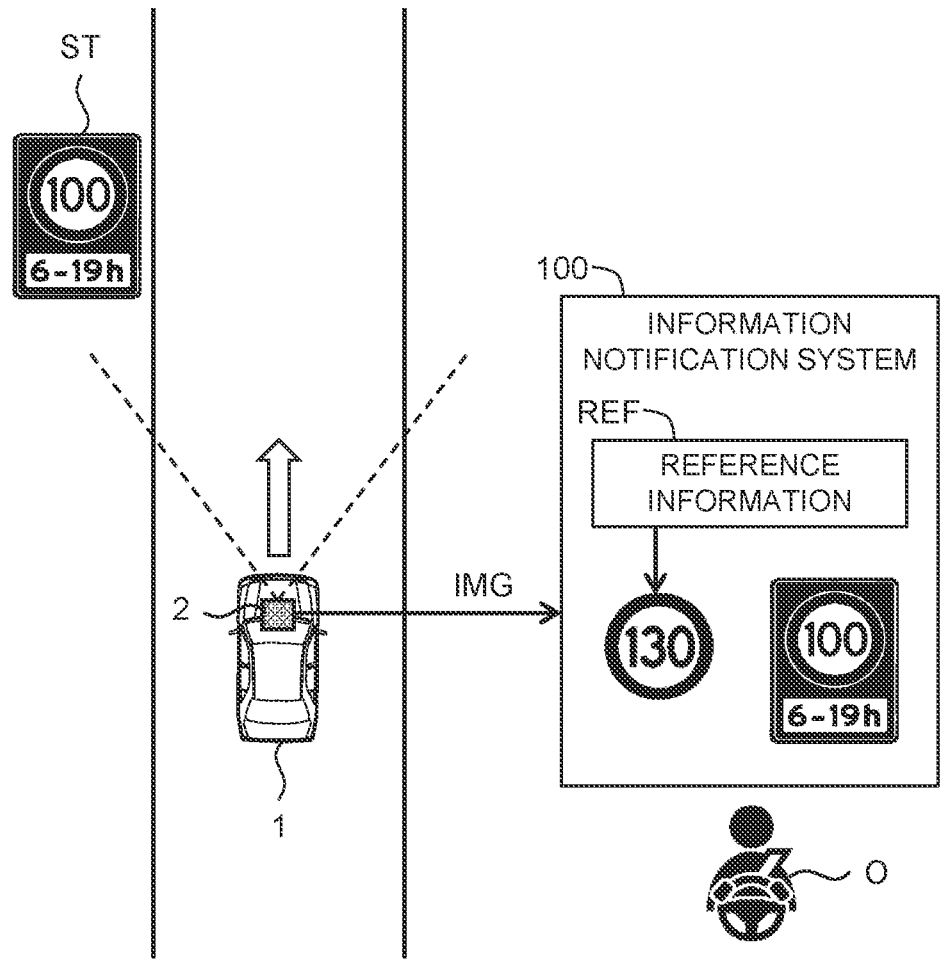
FIG. 2 is a conceptual diagram for explaining an example of information notification processing regarding a time-designated speed limit sign according to the first embodiment.

FIG. 2 is a conceptual diagram for explaining an example of the information notification processing regarding the time-designated speed limit sign ST. The information notification system 100 recognizes a time-designated speed limit sign ST installed on a road on which the vehicle 1 travels. In the example shown in FIG. 2, the specific time of day designated by the time-designated speed limit sign ST is from 6:00 to 19:00. When such the time-designated speed limit sign ST is recognized, the information notification system 100 acquires information on a "legal speed limit" on the road on which the time-designated speed limit sign ST is installed.

More specifically, the information notification system 100 holds "reference information REF" on the legal speed limit in a region in which the vehicle 1 is used. Here, the region in which the vehicle 1 is used means a country, a state, or the like. Traffic regulations are defined for each region. The reference information REF is generated in advance on the basis of the traffic regulations defined for each region. The reference information REF may be generated to cover a plurality of regions.

For example, the reference information REF associates a design of a speed limit sign S used in the region with the legal speed limit on a road on which the speed limit sign S is installed. The design of the speed limit sign S includes numbers (figures) of the speed limit designated by the speed limit sign S. For example, such a speed limit sign S that designates a speed limit equal to or higher than 100 km/h is installed on an expressway (limited highway). The legal speed limit on the expressway in the region is defined by the traffic regulations. It is therefore possible to generate the reference information REF that associates the design of the speed limit sign S with the legal speed limit.

However, the reference information REF is not limited only to the above example. Various examples of the reference information REF will be described later.

Based on the reference information REF, the information notification system 100 acquires information on the legal speed limit on the road on which the recognized time-designated speed limit sign ST is installed. In the example shown in FIG. 2, the information notification system 100 notifies the user O of the vehicle 1 of the legal speed limit in addition to the speed limit designated by the recognized time-designated speed limit sign ST.

As a result, the user O of the vehicle 1 can know not only the speed limit applied to the specific time of day but also the legal speed limit applied to other than the specific time of day. Such the information on the legal speed limit is useful for the user O, and thus convenience for the user O is improved. In some embodiments, for example, when a current time is outside the specific time of day, the user O can know the legal speed limit applied to the current time.

Figure 3:
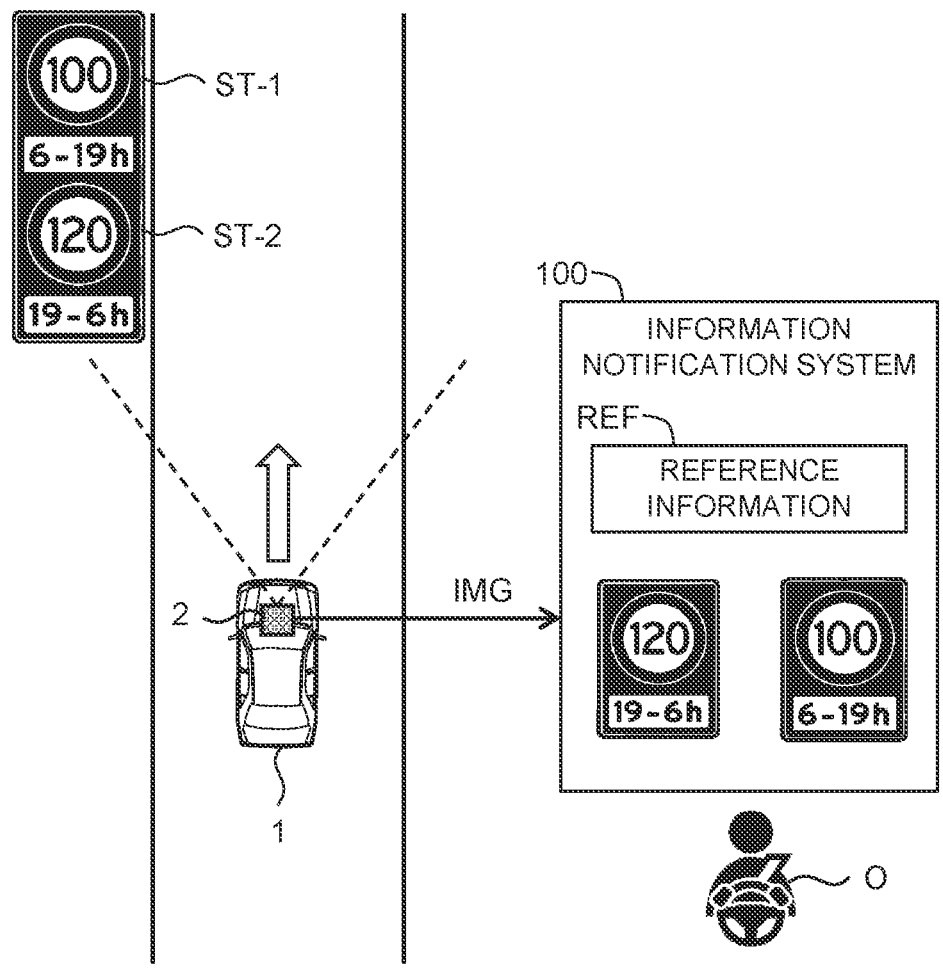
FIG. 3 is a conceptual diagram for explaining another example of information notification processing regarding a time-designated speed limit sign according to the first embodiment.

FIG. 3 is a conceptual diagram for explaining another example of the information notification processing regarding the time-designated speed limit sign ST. In the example shown in FIG. 3, a plurality of time-designated speed limit signs ST-1 and ST-2 designating different times of day are simultaneously recognized. The specific time of day designated by the time-designated speed limit sign ST-1 is from 6:00 to 19:00, and the specific time of day designated by the time-designated speed limit sign ST-2 is from 19:00 to 6:00. That is, the plurality of time-designated speed limit signs ST-1 and ST-2 designate all times of day as a whole.

In the example shown in FIG. 3, the information notification system 100 notifies the user O of the vehicle 1 of a plurality of speed limits respectively designated by the plurality of time-designated speed limit signs ST-1 and ST-2. As a result, the user O can know the speed limits for all times of day.

Since the user O can know the speed limits for all times of day, it is not always necessary to notify the user O of the legal speed limit. Therefore, the information notification system 100 may refrain from acquiring the information on the legal speed limit based on the reference information REF. Alternatively, the information notification system 100 may refrain from notifying the user O of the legal speed limit. In either case, the processing load on the information notification system 100 is reduced. In addition, since information is not notified to the user O more than necessary, the user O is prevented from feeling annoyed.

1-3. Configuration Example of Information Notification System

Figure 4:
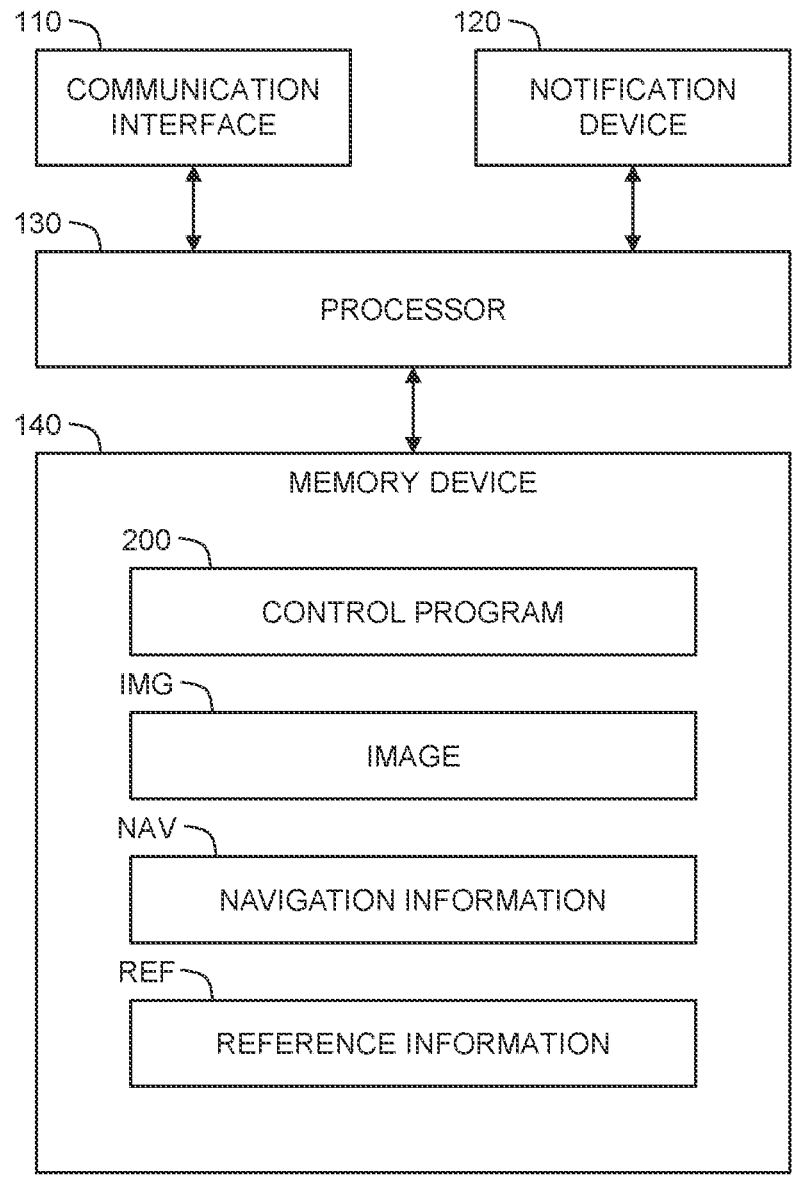
FIG. 4 is a block diagram showing a configuration example of an information notification system according to the first embodiment.

FIG. 4 is a block diagram showing a configuration example of the information notification system 100 according to the present embodiment. The information notification system 100 includes a communication interface 110, a notification device 120, one or more processors 130 (hereinafter simply referred to as a processor 130), and one or more memory devices 140 (hereinafter simply referred to as a memory device 140).

The communication interface 110 communicates with the outside of the information notification system 100. For example, the communication interface 110 communicates with the camera 2 mounted on the vehicle 1. When the user O is a remote operator who remotely operates (remotely drives or remotely supports) the vehicle 1 and the information notification system 100 is included in a remote operator terminal, the communication interface 110 communicates with the vehicle 1.

The notification device 120 notifies the user O of the vehicle 1 of a variety of information. When the user O is a driver in the vehicle 1, the notification device 120 is mounted on the vehicle 1. When the user O is a remote operator, the notification device 120 is included in a remote operator terminal. For example, the notification device 120 includes a display device. Examples of the display device include a display, a head-up display (HUD), and the like. As another example, the notification device 120 may include a speaker.

The processor 130 executes a variety of processing. For example, the processor 130 includes a central processing unit (CPU).

The memory device 140 stores a variety of information. Examples of the memory device 140 include a volatile memory, a nonvolatile memory, a hard disk drive (HDD), a solid state drive (SSD), and the like.

A control program 200 is a computer program for controlling the information notification system 100. The variety of processing by the information notification system 100 may be implemented by the processor 130 executing the control program 200. The control program 200 is stored in the memory device 140. Alternatively, the control program 200 may be recorded on a non-transitory computer-readable recording medium.

The processor 130 acquires an image IMG captured by the camera 2 mounted on the vehicle 1 via the communication interface 110. The image IMG is stored in the memory device 140.

In addition, the processor 130 acquires navigation information NAV from the vehicle 1 via the communication interface 110. The navigation information NAV includes map information and position information of the vehicle 1. The navigation information NAV may include information on a region (country, state, or the like) in which the vehicle 1 is present. The navigation information NAV is stored in the memory device 140.

The memory device 140 further stores the reference information REF. The reference information REF is information on the legal speed limit in the region (country, state, or the like) in which the vehicle 1 is used. The reference information REF may be generated to cover a plurality of regions.

Figure 5:
FIG. 5 is a conceptual diagram for explaining an example of reference information according to the first embodiment.

FIG. 5 is a conceptual diagram for explaining an example of the reference information REF. In the example shown in FIG. 5, the reference information REF associates a design of a speed limit sign S used in the region with the legal speed limit on a road on which the speed limit sign S is installed. The design of the speed limit sign S includes numbers (figures) of speed limit designated by the speed limit sign S. For example, such a speed limit sign S that designates a speed limit equal to or higher than 100 km/h is installed on an expressway (limited highway). The legal speed limit on the expressway in the region is defined by traffic regulations. It is therefore possible to generate the reference information REF that associates the design of the speed limit sign S with the legal speed limit.

The reference information REF shown in FIG. 5 may be an AI model that inputs an image of the speed limit sign S and outputs the legal speed limit. Such the AI model is generated in advance through a learning technique such as deep learning.

FIG. 6 is a conceptual diagram for explaining another example of the reference information REF. In the example shown in FIG. 6, the reference information REF indicates a correspondence relationship between a road type and the legal speed limit in the region. In other words, the reference information REF indicates the legal speed limit for each road type in the region.

As still another example, the reference information REF may be map information in which the legal speed limit for each position is registered.

1-4. Processing Flow

Figure 7:
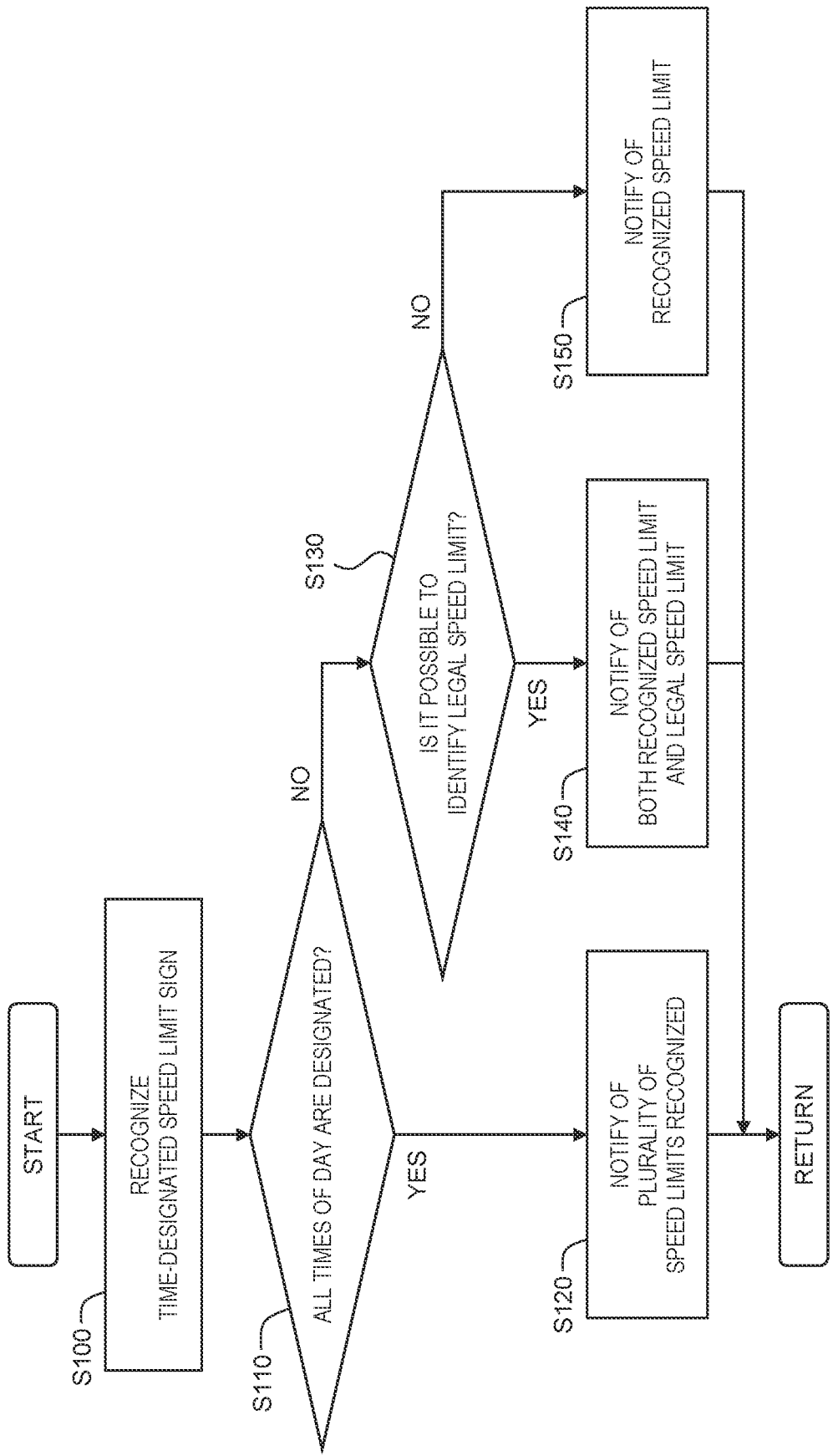
FIG. 7 is a flowchart showing information notification processing regarding a time-designated speed limit sign according to the first embodiment.

FIG. 7 is a flowchart showing the information notification processing regarding the time-designated speed limit sign ST according to the present embodiment.

In Step S100, the processor 130 recognizes one or more time-designated speed limit signs ST based on the image IMG captured by the camera 2 mounted on the vehicle 1. Typically, the above-described image recognition AI is used for recognizing the time-designated speed limit sign ST. In the example shown in FIG. 2, one time-specific speed limit sign ST is recognized. In the example shown in FIG. 3, a plurality of time-designated speed limit signs ST-1 and ST-2 designating different times of day are simultaneously recognized.

In Step S110, the processor 130 determines whether or not a first condition is satisfied. The first condition is that the recognized one or more time-designated speed limit signs ST designate all times of day as a whole. In the example shown in FIG. 2, the first condition is not satisfied. In the example shown in FIG. 3, the first condition is satisfied. When the first condition is satisfied (Step S110; Yes), the processing proceeds to Step S120. On the other hand, when the first condition is not satisfied (Step S110; No), the processing proceeds to Step S130.

In Step S120, the processor 130 notifies the user O of a plurality of speed limits respectively designated by the plurality of recognized time-designated speed limit signs STs via the notification device 120 (see FIG. 3). In some embodiments, at this time, the processor 130 refrains from acquiring the information on the legal speed limit based on the reference information REF. Alternatively, the processor 130 refrains from notifying the user O of the legal speed limit.

In Step S130, the processor 130 identifies the legal speed limit on the road on which the recognized time-designated speed limit sign is installed. More specifically, the processor 130 identifies the legal speed limit based on the reference information REF stored in the memory device 140. If necessary, the processor 130 recognizes the region (country, state, or the like) in which the vehicle 1 is present based on the navigation information NAV, and uses the reference information REF for the region.

The processing in the case of the reference information REF shown in FIG. 5 is as follows. The reference information REF associates the design of the speed limit sign S with the legal speed limit on the road on which the speed limit sign S is installed. The reference information REF may be an AI model that inputs an image of the speed limit sign S and outputs the legal speed limit. Based on an image of the recognized time-designated speed limit sign ST and the reference information REF, the processor 130 acquires the legal speed limit associated with the design of the time-designated speed limit sign ST.

The processing in the case of the reference information REF shown in FIG. 6 is as follows. The reference information REF indicates the legal speed limit for each road type. First, the processor 130 estimates a road type of the road on which the recognized time-designated speed limit sign ST is installed. For example, the design of the time-designated speed limit sign ST includes numbers (figures) of the speed limit. Such a time-designated speed limit sign that designates a speed limit equal to or higher than 100 km/h is installed on an expressway. Therefore, based on the design of the recognized time-designated speed limit sign ST, the processor 130 is able to estimate a road type of the road on which the recognized time-designated speed limit sign ST is installed. Alternatively, the processor 130 may identify the road type from the navigation information NAV (i.e., the map information and the position information of the vehicle 1). Then, the processor 130 acquires the legal speed limit set for the road type based on the reference information REF.

As still another example, the reference information REF may be map information in which a legal speed limit for each position is registered. In this case, the processor 130 acquires the legal speed limit at the position of the vehicle 1 based on the position information of the vehicle 1 and the reference information REF.

When the legal speed limit on the road on which the time-designated speed limit sign ST is installed is identified (Step S130; Yes), the processing proceeds to Step S140. In some situations, the legal speed limit may not be identified. In that case (Step S130; No), the processing proceeds to Step S150.

In Step S140, the information notification system 100 notifies the user O of both the speed limit designated by the recognized one or more time-designated speed limit signs ST and the legal speed limit via the notification device 120 (see FIG. 2).

In Step S150, the information notification system 100 notifies the user O of the speed limit designated by the recognized one or more time-designated speed limit signs ST via the notification device 120.

1-5. Effects

As described above, according to the present embodiment, one or more time-designated speed limit signs ST are recognized by the camera 2 mounted on the vehicle 1. Further, it is determined whether or not the first condition that the recognized one or more time-designated speed limit signs ST designate all times of day as a whole is satisfied.

When the first condition is not satisfied, the user O of the vehicle 1 is notified of the legal speed limit. As a result, the user O of the vehicle 1 can know not only the speed limit applied to the specific time of day but also the legal speed limit applied to other than the specific time of day. Such the information on the legal speed limit is useful for the user O, and thus convenience for the user O is improved. In some embodiments, for example, when a current time is outside the specific time of day, the user O can know the legal speed limit applied to the current time.

On the other hand, when the first condition is satisfied, the user O is notified of the plurality of speed limits respectively designated by the plurality of time-designated speed limit signs ST. In other words, the user O is notified of the speed limits for all times of day. In this case, it is not always necessary to notify the user O of the legal speed limit. Refraining from acquiring the information on the legal speed limit or refraining from notifying the user O of the legal speed limit makes it possible to reduce the processing load on the information notification system 100. In addition, since information is not notified to the user O more than necessary, the user O is prevented from feeling annoyed.

2. Second Embodiment

In a second embodiment, a case where the notification device 120 has a specification capable of notifying only one type of speed limit is considered. For example, due to a limited display space, the notification device 120 (display device) is capable of notifying only one type of speed limit.

In the second embodiment, the processor 130 notifies the user O of the vehicle 1 of only one of the speed limit designated by the recognized one or more time-designated speed limit signs ST and the legal speed limit. Basically, the processor 130 notifies the user O of the highest one of the speed limits being notification candidates.

Figure 8:
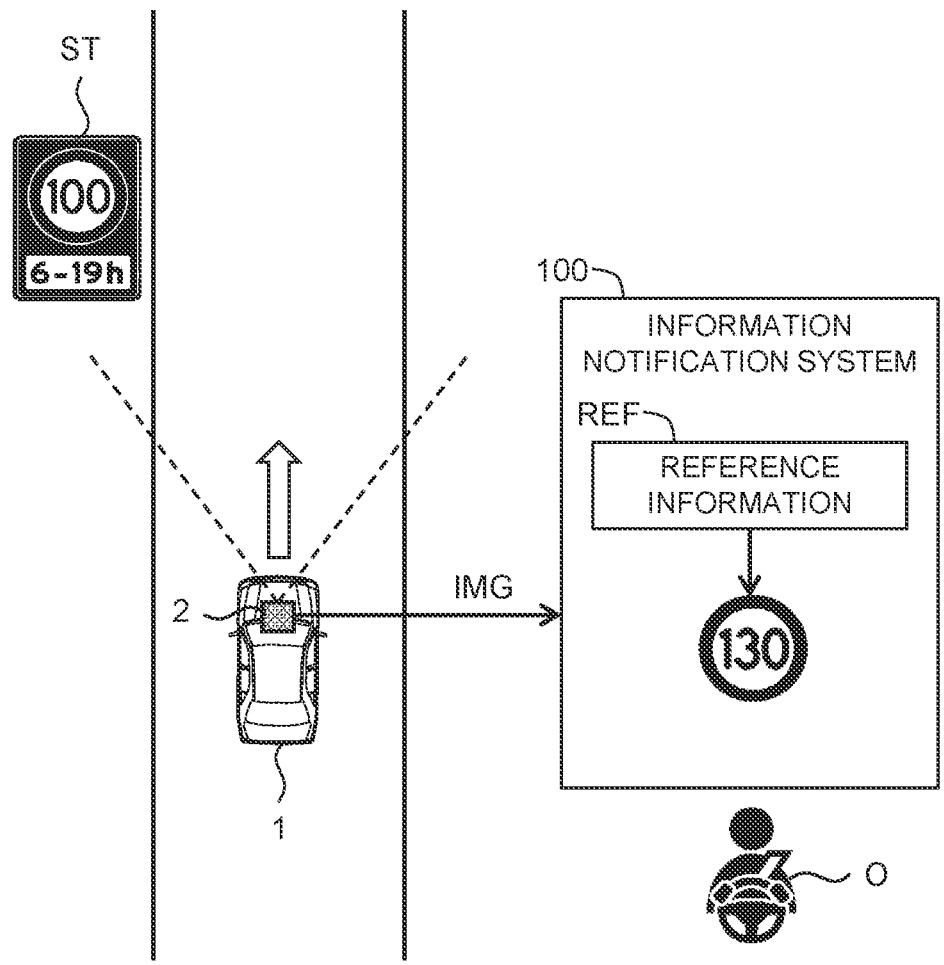
FIG. 8 is a conceptual diagram for explaining an example of information notification processing regarding a time-designated speed limit sign according to a second embodiment.

FIG. 8 shows a situation similar to that shown in FIG. 2. The processor 130 recognizes one time-designated speed limit sign ST designating a specific part time of day (6:00 to 19:00). Since the first condition is not satisfied, the processor 130 acquires information on the legal speed limit. Generally, the speed limit designated by the time-designated speed limit sign ST is lower than the legal speed limit. Therefore, the processor 130 notifies the user O of the vehicle 1 of the legal speed limit without notifying of the speed limit designated by the time-designated speed limit sign ST. Since the user O is notified of at least the information of the legal speed limit which cannot be obtained from the time-designated speed limit sign ST, convenience for the user O is improved. It should be noted that the time-designated speed limit sign ST is visually recognizable by the user O by oneself.

Figure 9:
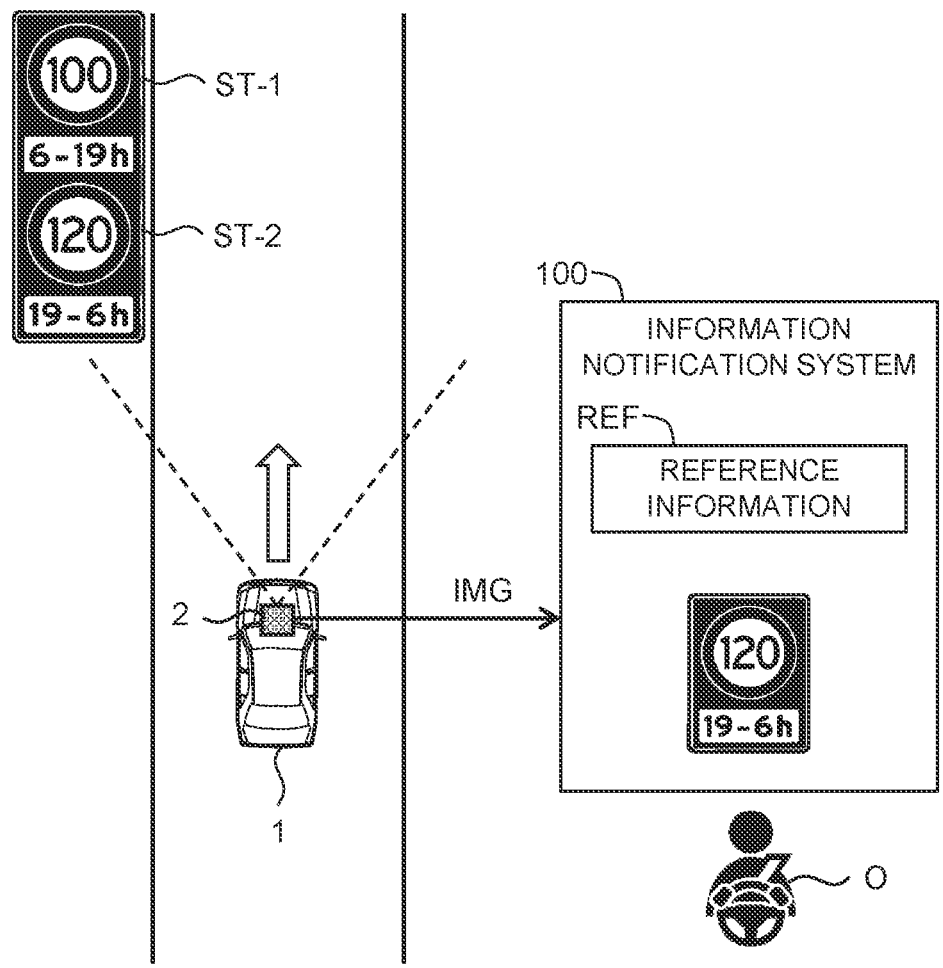
FIG. 9 is a conceptual diagram for explaining another example of information notification processing regarding a time-designated speed limit sign according to the second embodiment.

FIG. 9 shows a situation similar to that shown in FIG. 3. The processor 130 simultaneously recognizes the plurality of time-designated speed limit signs ST-1 and ST-2 designating different times of day. The first condition is satisfied. In this case, the processor 130 notifies the user O of the vehicle 1 of any one of the plurality of speed limits respectively designated by the plurality of time-designated speed limit signs ST-1 and ST-2. For example, the processor 130 notifies the user O of the highest one of the plurality of speed limits.

As a modification example, the processor 130 may notify the user O of the vehicle 1 of one speed limit applied to the current time among the plurality of speed limits. The current time is obtained from a clock. The information on the times of day respectively designated by the plurality of time-designated speed limit signs ST-1 and ST-2 is obtained by analyzing images of the plurality of time-designated speed limit signs ST-1 and ST-2. The processor 130 selects one time-designated speed limit sign ST designating a time of day including the current time, and notifies the user O of the speed limit designated by the selected time-designated speed limit sign ST.

Figure 10:
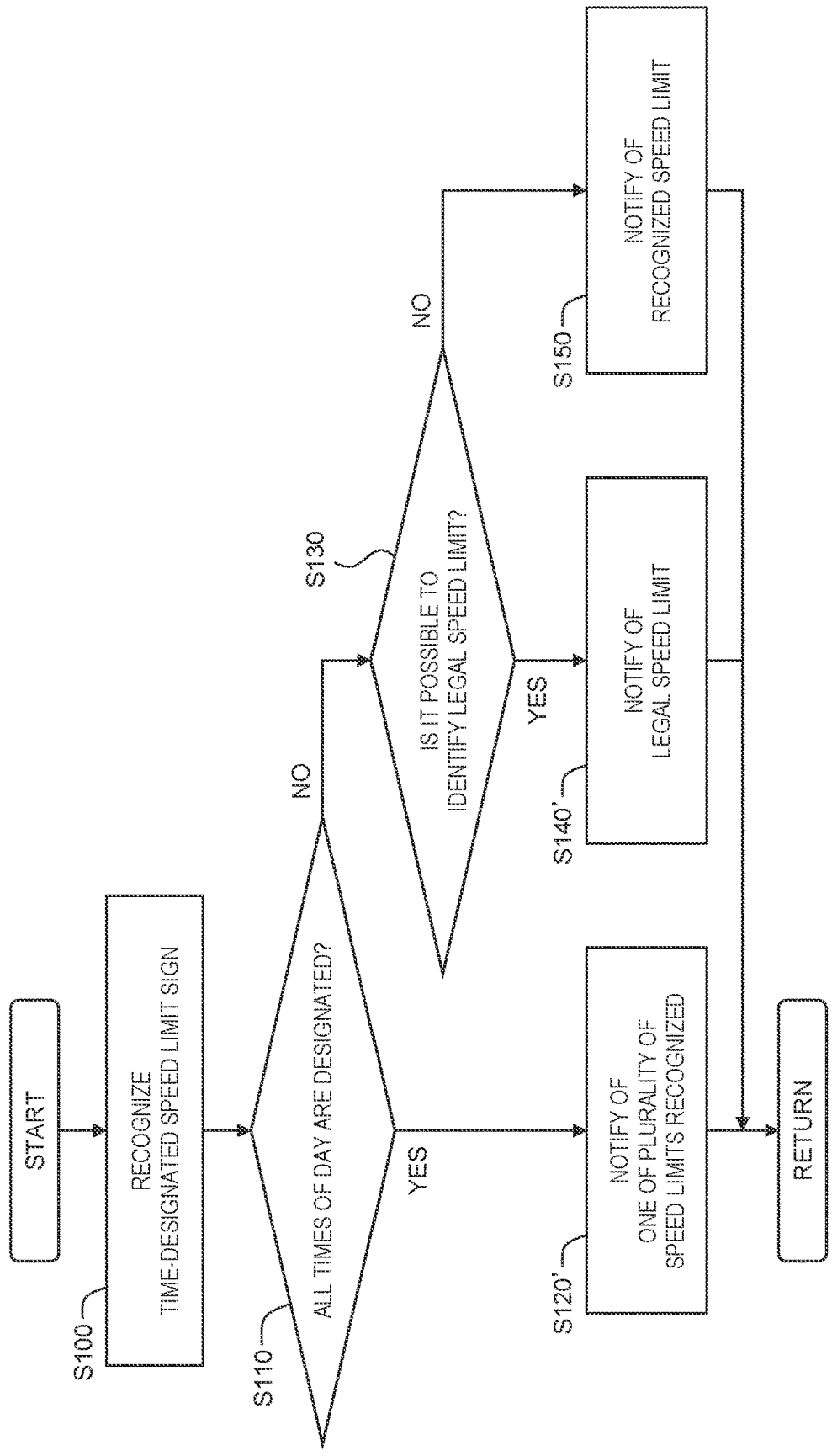
FIG. 10 is a flowchart showing information notification processing regarding a time-designated speed limit sign according to the second embodiment.

FIG. 10 is a flowchart showing the information notification processing regarding the time-designated speed limit sign ST according to the second embodiment. Compared with the flowchart in the first embodiment (see FIG. 7), Step S120 is replaced with Step S120', and Step S140 is replaced with Step S140'. A description overlapping with the first embodiment will be omitted as appropriate.

In Step S120', the processor 130 notifies the user O of one of the plurality of speed limits respectively designated by the recognized plurality of time-designated speed limit signs STs (see FIG. 9).

In Step S140', the information notification system 100 notifies the user O of the legal speed limit without notifying of the speed limit designated by the time-designated speed limit sign ST (see FIG. 8).

What is claimed is:

1. An information notification system for notifying a user of a vehicle of information,
the information notification system comprising:
one or more processors; and
one or more memory devices configured to store reference information on a legal speed limit in a region in which the vehicle is used,
wherein the one or more processors are configured to:
recognize a time-designated speed limit sign designating a plurality of speed limits associated with a plurality of time periods based on an image captured by a camera mounted on the vehicle;
determine whether the plurality of time periods cover all times of day;
upon determination that the plurality of time periods cover all times of day, notify the user of the plurality of speed limits and the associated plurality of time periods; and
upon determination that the plurality of time periods do not cover all times of day:
determine a legal speed limit on a road associated with the time-designated speed limit sign for times other than the plurality of time periods; and
notify the user of the plurality of speed limits, the associated plurality of time periods, and the determined legal speed limit for times other than the plurality of time periods.

2. The information notification system according to claim 1, wherein
upon determination that the plurality of time periods cover all times of day, the one or more processors are further configured to notify the user of a highest one of the plurality of speed limits.

3. The information notification system according to claim 1, wherein
the one or more processors are further configured to acquire the legal speed limit on the road on which the time-designated speed limit sign is installed, based on a design of the time-designated speed limit sign and the reference information.

4. The information notification system according to claim 3, wherein
the reference information associates a design of a speed limit sign used in the region with the legal speed limit on the road on which the speed limit sign is installed, and
the one or more processors are further configured to acquire the legal speed limit associated with the design of the time-designated speed limit sign based on the reference information.

5. The information notification system according to claim 3, wherein
the reference information indicates the legal speed limit for each road type, and
the one or more processors are further configured to:
estimate a road type of the road on which the time-designated speed limit sign is installed, based on the design of the time-designated speed limit sign; and
acquire the legal speed limit set for the road type based on the reference information.

6. An information notification method for notifying a user of a vehicle of information by a computer,
the information notification method comprising:
recognizing a time-designated speed limit sign designating a plurality of speed limits associated with a plurality of time periods based on an image captured by a camera mounted on the vehicle;
determining whether the plurality of time periods cover all times of day;
upon determination that the plurality of time periods cover all times of day, notifying the user of the plurality of speed limits and the associated plurality of time periods; and
upon determination that the plurality of time periods do not cover all times of day:
determining a legal speed limit on a road associated with the time-designated speed limit sign for times other than the plurality of time periods; and
notifying the user of the plurality of speed limits, the associated plurality of time periods, and the determined legal speed limit for times other than the plurality of time periods.

7. The information notification system according to claim 1, wherein
the reference information is an artificial intelligence model configured to input an image of a speed limit sign used in the region and to output the legal speed limit in the region, and
the one or more processors are configured to input the image of the speed limit sign to determine the legal speed limit.

* * * * *